United States Patent
Manku et al.

[11] Patent Number: 6,148,184
[45] Date of Patent: Nov. 14, 2000

[54] RADIO FREQUENCY ZERO IF DIRECT DOWN CONVERTER

[75] Inventors: Tajinder Manku, Halifax; Leonard MacEachern, Ottawa, both of Canada

[73] Assignee: Mitel Corporation, Kanata, Canada

[21] Appl. No.: 09/121,054

[22] Filed: Jul. 23, 1998

[30]       Foreign Application Priority Data

Aug. 28, 1997 [GB] United Kingdom .................... 9718094

[51] Int. Cl.[7] ...................................................... H04B 1/04
[52] U.S. Cl. .............................. 455/110; 455/111; 455/3; 375/329
[58] Field of Search ..................................... 455/107, 110, 455/111, 112, 118, 119; 375/326, 329

[56]             References Cited

U.S. PATENT DOCUMENTS

| | | |
|---|---|---|
| 4,254,503 | 3/1981 | Vance . |
| 4,507,617 | 3/1985 | Sasaki ........................................ 329/50 |
| 5,303,417 | 4/1994 | Laws . |
| 5,323,425 | 6/1994 | Colamonico et al. . |
| 5,584,059 | 12/1996 | Turney et al. . |
| 5,584,068 | 12/1996 | Mohindra . |
| 5,787,362 | 8/1998 | Matero ..................................... 455/553 |

FOREIGN PATENT DOCUMENTS 1565899  12/1977  United Kingdom .

*Primary Examiner*—Thanh Cong Le
*Assistant Examiner*—N. Mehrpour
*Attorney, Agent, or Firm*—George MacGregor; Marks & Clerk

[57]                ABSTRACT

An RF direct down-conversion topology that is insensitive to leakage and device mismatching is presented. According to the system the RF signal is split into two arms with each arm having a mixer. Each mixer has two inputs namely a phase modulated local oscillator signal and the RF information signal. The phase modulated local oscillator signal between each arm differs by a 90 degrees phase shift. The output of the mixers is subtracted and the output of the subtractor is mixed with the phase modulation signal. The output of the third mixer represents the base band. A low pass filter then removes the unwanted signals.

12 Claims, 2 Drawing Sheets

INPUT SIGNAL

AFTER THIRD MIXER

AFTER SUBTRACTION

AFTER LPF

RADIO FREQUENCY ZERO IF DIRECT DOWN CONVERTER

FIELD OF THE INVENTION

This invention relates to the field of radio frequency communications and more particularly to a zero-IF converter that is insensitive to local oscillator (LO)-RF leakage and device mismatching.

BACKGROUND

In an RF receiver, such as a radio receiver for cellular communications, the incoming RF frequency must be down-converted to an intermediate frequency by mixing it with a local oscillator frequency.

In conventional direct zero-IF converters problems traditionally arise due to RF-LO, LO-RF, and LO-antenna leakage, DC offsets that arise due to mismatching of the devices used in a direct conversion RF, and the variable DC offsets that occur due to the direct down-conversion process itself.

In the prior art, these problems have been addressed by placing a metal shield on the direct conversion receiver to isolate it from the antenna. This reduces the amount of leakage from the local oscillator to the antenna.

The RF-LO and LO-RF leakage was solved by developing mixer circuitry that isolates the RF portion from the LO portion.

The DC offsets were reduced by using matched devices. This was accomplished by placing devices fairly close together on an IC.

Fairly complicated adaptive DC removal techniques have also been used, and low -IF instead of true Zero-IF has been used.

SUMMARY OF THE INVENTION

According to a first aspect of the present invention there is provided a system for the direct conversion of an RF signal having a carrier modulated by a data signal. The system comprises input means to receive the RF signal; an oscillator to generate a local oscillator signal; means to provide a phase modulating signal; a phase modulator to receive the local oscillator signal and the phase modulating signal and to generate therefrom first and second toggle signals having a 90 degrees phase difference therebetween; a first mixer to receive the RF signal and the first and second toggle signals and to generate therefrom a first base band signal; a second mixer to receive the RF signal and the first and second toggle signals and to generate therefrom a second base band signal; a subtractor to receive and subtract the first and second base band signals to generate a third signal; and a third mixer to receive the third signal and the phase modulating signal and to generate therefrom the data signal.

According to a second aspect of the present invention there is provided a method of directly converting an RF signal containing a carrier modulated by a data signal comprising a): supplying the RF signal to first and second mixers; b) generating and supplying to a phase modulator a local oscillator signal; c) supplying to the phase modulator a phase modulation signal; d) generating in the phase modulator first and second toggle signals having a phase difference of 90° therebetween; e) supplying the first and second toggle signals to the first and second mixers and generating from the RF signal and the toggle signals first and second base bands; f) subtracting the first and second base bands to generate a third signal; g) supplying the first and second base bands and the phase modulation signal to a third mixer; and h) generating in the third mixer the data signal.

BRIEF DESCRIPTION OF THE DRAWINGS

The invention will now be described in more detail by way of example only with reference to the accompanying drawings in which.

DETAILED DESCRIPTION OF THE INVENTION

Figure 1:
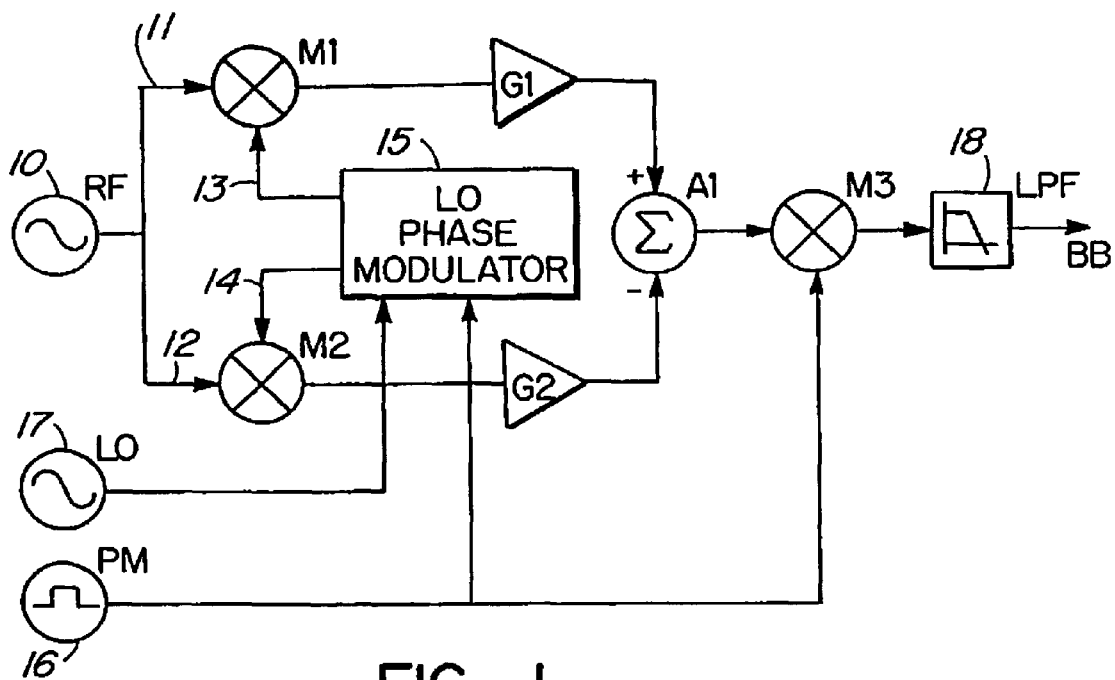
FIG. 1 is a block diagram of a direct zero-IF downconversion system.

The invention effectively increases the isolation between the RF-LO, LO-RF, and LO-antenna leakage; where LO denotes the local oscillator in a direct conversion RF receiver.

In the system operating according to the invention, an RF signal is converted into an in-phase I (signal 1) and out-of-phase Q (signal 2) base band signal. The I (signal 1) and Q (signal 2) base band signals are converted to a Q (signal 1) and I (signal 2) base band signal, respectively after some predetermined time. The toggling between I to Q, and Q to I continues with time as the RF signal is converted into signal 1 and 2. The toggling between I to Q and then Q to I, and so on, is denoted as the toggling signal. Signal 1 and signal 2 are then subtracted and the resulting signal is denoted as signal 3. Signal 3 is then multiplied by the toggling signal. The output arising from said multiplication is then passed through a filter so to remove the effects due to LO-RF/RF-LO leakage and device mismatch.

The RF direct down conversion topology is insensitive to LO-RF, RF-LO leakage and device mismatching.

In the system shown in FIG. 1, the incoming RF signal 10 is split into two arms. One arm has a mixer M1 and the second has a mixer M2.

Each mixer M1 and M2 has two inputs, one receiving the phase modulated local oscillator signal 13, 14 and the other receiving the RF information signal 11, 12.

The phase modulated local oscillator signal 13 in the top arm differs from that of the bottom arm by a 90 degree phase shift. The local oscillator phase modulator block 15 switches the local oscillator input 13, 14 of each mixer alternately between the leading phase or the lagging phase of the local oscillator signal 17 in accordance with the (phase modulation) signal 16. The phase modulation signal 16 is ideally equal to +V or −V, where V is some arbitrary number.

The two signals at the output of mixers M1 and M2 are both amplified (the two amplifiers need not be identical) by amplifiers G1 and G2. The output signal from the two arms are then subtracted using a subtractor A1. The output of the subtractor A1 is then the input for a third mixer, M3. The third mixer M3 also has the phase modulation signal 16 as an input. The output of the third mixer then passes through a filter 18.

Figure 2:
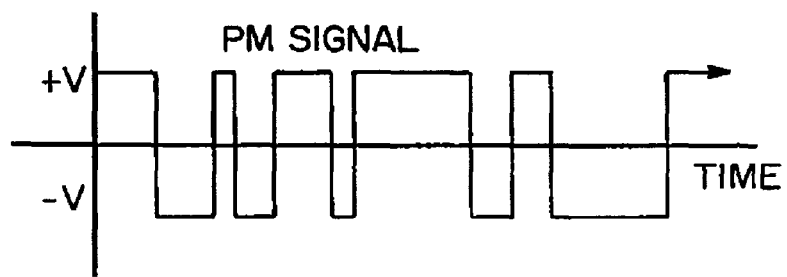
FIG. 2 is a chart showing an example of a phase modulation signal.

An example of the pulse modulation signal is shown in FIG. 2. The pulse modulation signal can either be periodic, aperiodic, random or pseudo-random. The local oscillator signal is a periodic signal, for example a square wave or a sign wave. The RF signal contains a carrier wave modulated by either digital and/or an analog information, i.e. video or voice.

Figure 3A:
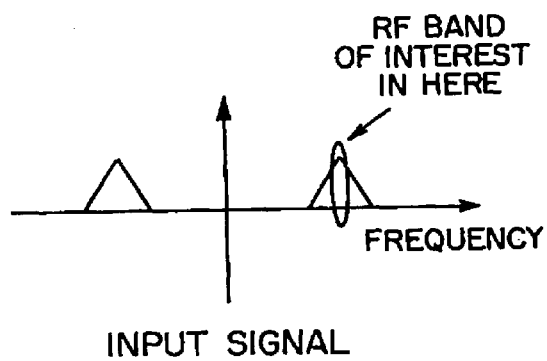
FIGS. 3a to 3d are frequency domain plots at different points in the system.
Figure 3C:
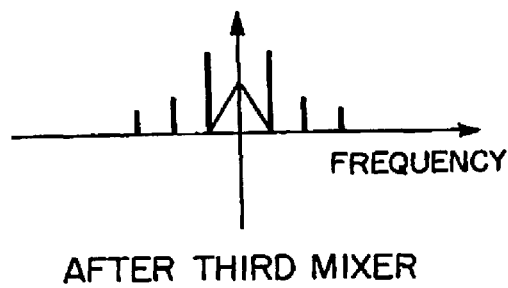
Figure 3B:
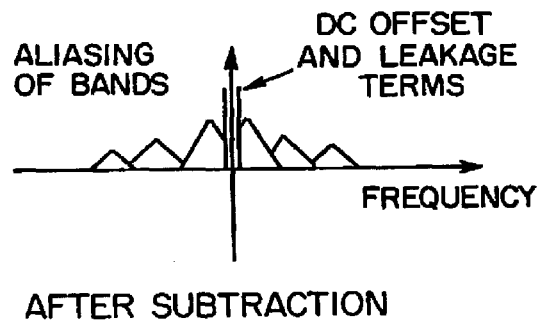
Figure 3D:
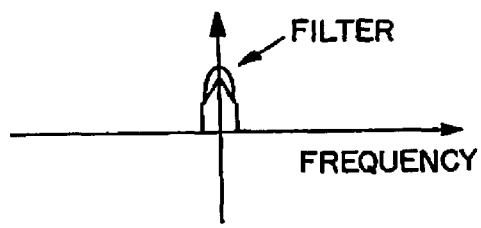

The basic operation of the structure can be illustrated using the frequency domain plots shown in FIGS. 3a to 3D. The "Input signal", which is any RF signal, into the structure may take the form shown in FIG. 3a. In this example the signal of interest is only a fraction of the total input signal and is located at the center of the total signal. After the subtracting stage the spectrum will look like the spectrum shown in FIG. 3b. The total signal has spread itself throughout the frequency spectrum. For the purpose of this example it is assumed that the toggle signal is square wave with a 50% duty cycle. The DC parasitic leakage terms are located near DC. After the third mixer the spectrum convolves with the square wave and the total spectrum consequently deconvolving itself to base band as shown in FIG. 3c. The low pass filter then removes the unwanted signal, i.e. the DC offsets and the portion of the total signal that is not needed. This is shown in FIG. 3d.

The present invention provides the following advantages over existing direct conversion topologies. The structure is insensitive to RF to LO and LO to RF leakage. No high-quality filters are required. The structure can be completely integrated on an IC. DC terms are inherently canceled by the operation of the structure.

It is anticipated that the invention according to the present application will be applicable as the radio frequency receiver for cellular applications. It is also anticipated that it can be used as the radio frequency receiver for wireless personal communications systems and for global position systems (GPS). It may also find application as the radio frequency receiver for any frequency hopping application and for any satellite application whether it be on the ground or on the satellite itself. It is also anticipated that the invention can be used in a scanning spectrum analyzer as well as any combinations or integration of the aforementioned applications. In short, the invention may be used in any new application that requires a down-conversion of any RF signal to base band.

As discussed the modulated local oscillator is generated by taking a non-modulated local oscillator signal and switching its phase by 90 degrees to 0 degrees according to a so-called pulse modulation signal. The RF signal is first mixed with the modulated local oscillator signal and then unwanted aliased terms are removed by further mixing with the phase modulation signal. In doing this it removes the leakage effects previously discussed. Mixing does not necessarily require analog multiplication.

The third mixer, in general, can be replaced by a component or components that convolute the output of the subtract signal to the phase modulation signal. For example, this component may be replaced by digital elements. The mixers and gain elements in the top and lower branches of the circuit shown in FIG. 1 can be in any order, i.e. the gain stage can be first and the mixer stage second. Further, the gain elements in the tip and lower branches can be incorporated into the respective mixers that precede them.

Although one embodiment of the present invention has been described and illustrated it will be apparent to one skilled in the art that various alternatives can be introduced. It is to be understood that such variations will fall within the scope of the invention as defined by the appended claims.

What is claimed is:

1. A system for the direct conversion of an RF signal having a carrier modulated by a data signal, said system comprising:

input means to receive said RF signal;

means to provide a phase modulating signal;

a phase modulator to receive said local oscillator signal and said phase modulating signal and to generate therefrom first and second toggle signals having a 90 degree phase difference therebetween;

a first mixer to receive said RF signal and said first and second toggle signals and generating therefrom a first base band signal;

a second mixer to receive said RF signal and said first and second toggle signals and generating therefrom a second base band signal;

a subtractor to receive and subtract said first and second base band signals to generate a third signal; and a third mixer to receive said third signal and said modulating signal and to generate therefrom said data signal.

2. A system as defined in claim 1 further having a low pass filter after said third mixer to remove any unwanted signals.

3. A system as defined in claim 1 wherein said data signal contains digital information.

4. A system as defined in claim 1 wherein said data signal contains analog information.

5. A system as defined in claim 1 wherein said local oscillator generates a signal having the same frequency as said carrier.

6. A system as defined in claim 1 wherein said modulating signal is periodic.

7. A system as defined in claim 5 wherein modulating signal is periodic.

8. A system as defined in claim 1 wherein said modulating signal is aperiodic.

9. A system as defined in claim 1 wherein said modulating signal is aperiodic.

10. A system as defined in claim 1 wherein said modulating signal is pseudo-random.

11. A system as defined in claim 1 having an amplifier between each of said first and second mixers and said subtractor.

12. A method of directly converting an RF signal containing a carrier modulated by a data signal comprising:

a) supplying said RF signal to first and second mixers;

b) generating and supplying to a phase modulator a local oscillator signal;

c) supplying to said phase modulator a phase modulation signal;

d) generating in said phase modulator first and second toggle signals having a phase difference of 90 degrees therebetween;

e) supplying said first and second toggle signals to said first and second mixers and generating from said RF signal and said toggle signals first and second base bands;

f) subtracting said first and second base bands to generate a third signal;

g) supplying said first and second base bands and said phase modulation signal to a third mixer; and h) generating in said third mixer said data signal.

* * * * *